G. FRANKS & O. SPROESSIG.
STEAMER, CLEANER, AND PRESSER.
APPLICATION FILED NOV. 4, 1916.
1,218,639.
Patented Mar. 13, 1917.
2 SHEETS—SHEET 1.
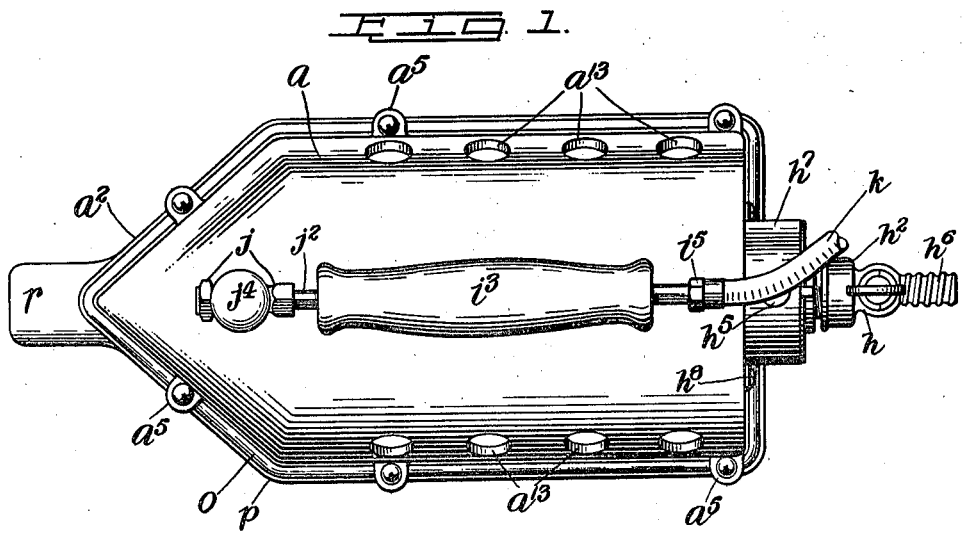
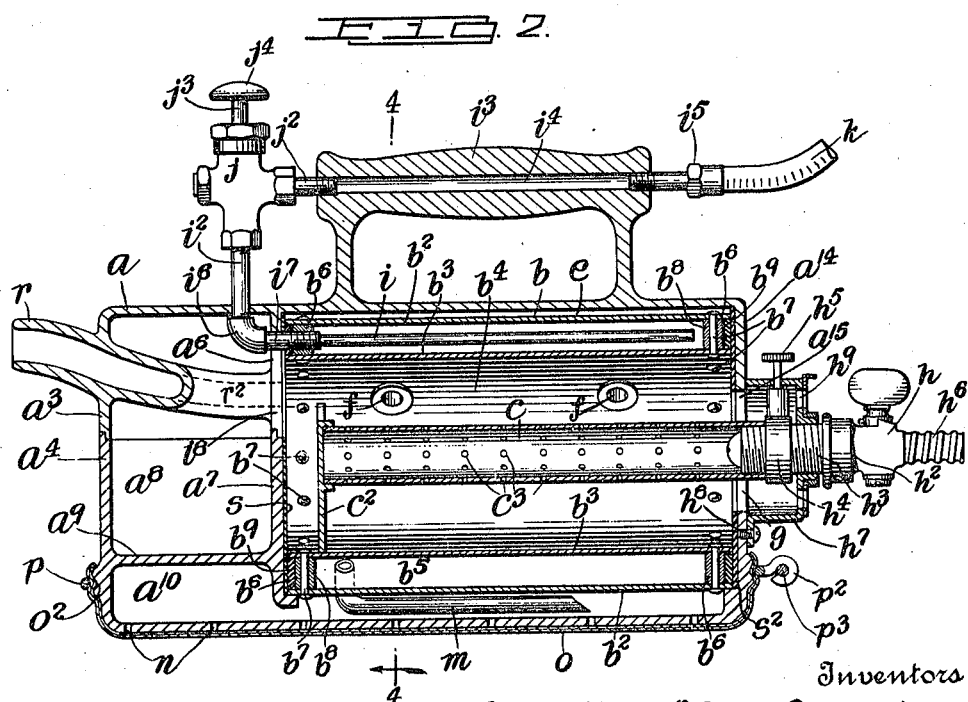
Inventors
George Franks & Oscar Sproessig.
By their Attorneys

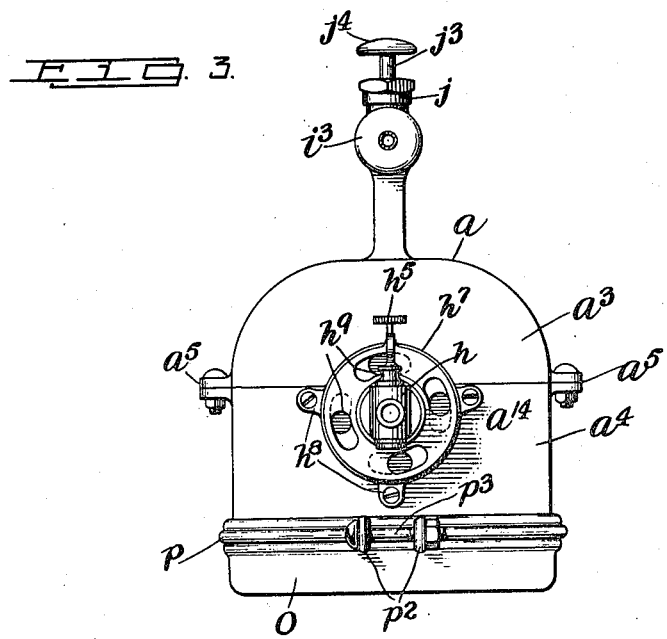
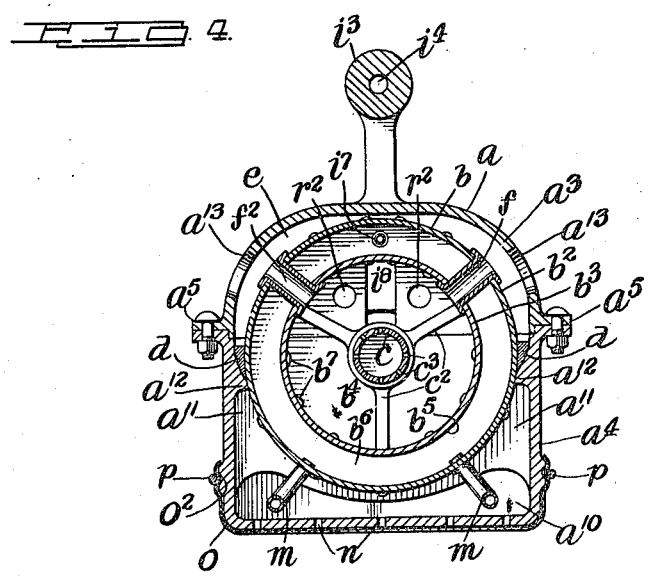

UNITED STATES PATENT OFFICE.

GEORGE FRANKS AND OSCAR SPROESSIG, OF NEW YORK, N. Y.

STEAMER, CLEANER, AND PRESSER.

1,218,639.  Specification of Letters Patent.  Patented Mar. 13, 1917.

Application filed November 4, 1916. Serial No. 129,425.

*To all whom it may concern:*

Be it known that we, GEORGE FRANKS and OSCAR SPROESSIG, citizens of the United States, and residing at New York, in the county of New York and State of New York, have invented certain new and useful Improvements in Steamers, Cleaners, and Pressers, of which the following is a specification, such as will enable those skilled in the art to which it appertains to make and use the same.

This invention relates to devices for use by tailors and others in steaming, cleaning and pressing garments, and the object thereof is to provide an improved device of this class which is simple in construction, effective in operation, and convenient of manipulation, and which may be operated by hand in the manner of an ordinary sadiron in contradistinction to the heavy and complicated devices or machines now used for this purpose.

The invention is fully disclosed in the following specification, of which the accompanying drawing forms a part, in which the separate parts of our improvement are designated by suitable reference characters in each of the views, and in which:—

Figure 1 is a plan view of a device of the class specified involving our invention;

Fig. 2 a central longitudinal section thereof;

Fig. 3 a rear end view of the device; and,

Fig. 4 a transverse section on the line 4—4 of Fig. 2.

In the practice of our invention, we provide the casing $a$ which is of the general form of an ordinary sadiron, and which is oblong and approximately rectangular in cross section and the front end portion of which is tapered as shown at $a^2$.

The casing $a$ in the construction shown is composed of a top part $a^3$ and a bottom part $a^4$, and said parts are provided with projecting ears through which are passed bolts by which they are connected as shown at $a^5$.

The front part of the casing is provided with a transverse partition $a^6$ and $a^7$ formed partly in connection with the top part $a^3$ and partly in connection with the bottom part $a^4$, and which forms in the front end of the device a chamber $a^8$ having a bottom $a^9$ below which is a steam chamber $a^{10}$, which extends the full length of the device, and the partition $a^6$—$a^7$ forms in the central and rear end part of the casing a space $a^{11}$ in which is mounted a steam generator $b$, which is cylindrical in form, and which comprises an outer shell $b^2$ and an inner concentric shell $b^3$ into which is passed from the rear end of the generator a burner tube $c$ with which are connected radial supports $c^2$, which serve to center said burner tube in the inner shell $b^3$.

At the opposite sides of the generator $b$, the side portions of the bottom part of the casing $a$ are provided with inwardly directed longitudinal ribs $a^{12}$ which support the generator, and above which is placed packing material $d$ and the steam chamber $a^{10}$ which extends the full length of the device also extends upwardly at the sides of the generator to the ribs $a^{12}$, and in the top portion of the casing and inclosing the top portion of the generator is an air chamber $e$, and the top portion of the generator is provided with radial tubes $f$ which form air ports or passages $f^2$, which communicate with the chamber $e$ and the interior of the inner shell $b^3$ of the generator, or the central chamber $b^4$ formed therein by said shell, and which constitutes the combustion chamber of the generator and the top portion $a^3$ of the shell, is provided with ports or passages $a^{13}$ through which air passes to the chamber $e$.

The rear end $a^{14}$ of the casing $a$ is provided with a central opening $a^{15}$ formed in the top and bottom parts of said casing and the burner tube $c$ is passed through this opening, which is much larger than said burner tube and which forms an air inlet $g$ around said burner tube.

The burner tube $c$ is provided with the usual gas outlet ports or passages $c^3$, and connected with said burner tube is an ordinary gas supply and regulator device $h$, comprising a fixture $h^2$ having a threaded tube $h^3$ which is screwed into the rear end of the burner tube, and is provided with a regulator $h^4$ having a valve device $h^5$, and the fixture $h^2$ is provided with the usual threaded sleeve or nozzle $h^6$, whereby a flexible tube may be connected therewith.

Mounted on the threaded tube $h^3$ is a cap-shaped casing $h^7$ which is secured to the bottom part of the casing by screws $h^8$, and the valve device $h^5$ projects through and is operated through the rim portion of said casing, and said casing is also provided with the usual air inlet and regulator device or devices $h^9$.

The gas supply and regulator device $h$ may be of any preferred construction, and the object thereof, is to supply air to the burner tube $c$ and regulate the amount thereof and to supply air to the combustion chamber $b^4$ which incloses said burner tube, and any suitable device may be used for this purpose.

The shells $b^2$ and $b^3$ of the generator form a water and steam chamber $b^5$, the ends of which are closed by annular packings $b^6$ through which are passed rivets $b^7$, and the packings $b^6$ consist of inner metallic members $b^8$ through which are passed the rivets $b^7$ and the outer parts $b^9$ preferably composed of asbestos or similar material, but any suitable construction may be employed for connecting the ends of the shells $b^2$ and $b^3$, and packing the ends of the chamber $b^5$ formed by said shells.

In the top part of the chamber $b^5$ is a perforated tube $i$ which is passed thereinto through the front end of said chamber and which forms the water supply of the device, and with the front end of which is connected a tube $i^2$ which passes upwardly through the top of the top portion $a^3$ of the casing $a$, and is in line with a handle $i^3$ with which said top portion of the casing is provided, and which may be formed integrally therewith, or separately therefrom, and said handle is provided with a central bore $i^4$, and the tube $i^2$ is provided with a valve coupling $j$ having a tube connection $j^2$ which passes into the front end portion of the handle and communicates with the bore $i^4$, and the rear end portion of the handle is provided with a coupling $i^5$ which also communicates with said bore and with which, in practice, is connected a flexible water supply tube $k$.

The valve coupling $j$ is provided with a spring-controlled valve, having a stem $j^3$ provided with a head $j^4$, and which may be operated by a thumb or finger of a hand grasping the handle $i^3$, but as the valve coupling $j$ and its valve device are of the usual or any preferred construction the details thereof are not shown and described.

The bottom portion of the steam and water chamber $b^5$ of the generator $b$ is placed in communication with the steam chamber $a^{10}$ in the bottom of the casing $a$ by means of tubes $m$, in the construction shown, but this communication may be made in any desired manner, and the bottom of the chamber $a^{10}$ is provided with steam ports or passages $n$, any desired number of which may be employed, and, in practice, or in the use of this device, the bottom of the bottom part $a^4$ of the casing, in which the steam ports or passages $n$ are formed, is inclosed by an ordinary steam pad $o$, consisting of separate layers of any suitable fabric.

In order to secure the steam pad $o$ to the bottom of the device, we form in the bottom part of the casing $a$, in the construction shown, a groove $o^2$ which extends entirely around said part, and above which the pad extends, and a clamp device $p$ is passed around the top edge portion or portions of the pad $o$, or the material thereof, and by means of which said top or edge portions of the pad, or the material thereof, are compressed in the groove $o^2$.

The clamp device $p$, in the construction shown, consists of a flexible wire, the ends of which are provided with heads $p^2$ through which are passed a bolt $p^3$, but any suitable means may be employed for connecting the steam pad $o$ with the bottom of the casing $a$.

The front end of the combustion chamber $b^4$ in the generator $b$ is provided with means for discharging the hot air and products of combustion from said chamber and, in the construction shown, said means consists of a tube $r$ which passes through the front end of the top part of the casing $a$ and communicates with branch tubes $r^2$ which communicate with the chamber $b^4$.

In the construction shown, the tubes $r$ and $r^2$ are formed integral and integral with the top part of the casing $a$ and the partition member $a^6$, but this discharge of the products of combustion from the chamber $b^4$ may be formed in any desired manner.

In the construction shown, the generator $b$, or the body portion thereof, consists of the outer and inner shell $b^2$ and $b^3$ and the burner tube $c$, the outer and inner shells being packed at their ends and connected as shown and described, and with this construction we employ front and rear end packing sheets $s$ and $s^2$ of asbestos or similar material, and the generator may be removed from the casing $a$ without removing said packing sheets, but our invention is not limited to the use of these packing sheets, nor to the specific construction of the generator herein shown and described, all that is necessary being that the said generator employ the outer and inner shells $b^2$ and $b^3$ in its construction, and the burner tube $c$. The water supply tube $i$ is connected with the tube $i^2$ by means of an elbow coupling $i^6$ having a tubular sleeve $i^7$ into which the tube $i$ is screwed, and the partition wall $a^6$ in the top part of the casing $a$ is provided with a slot $i^8$ through which the tubular sleeve $i^7$ may be passed, and with this construction the top $a^3$ of the casing $a$ may be detached from the bottom part $a^4$, and by disconnecting the parts $i^2$ and $j$ from the coupling $i^6$, the top part $a^3$ of the casing may be lifted off, after which the generator may be lifted out of the bottom part of said casing by detaching the cap-shaped casing $h^7$ and its connected parts including the burner tube.

In the use of this device the gas and air are admitted into the burner tube and into the chamber $b^4$ and ignited in the manner of other burners of this class, and when the shell $b^3$ of the generator has become heated to the desired degree, the water in the desired quantity is admitted into the pipe $i$ by depressing the valve in the valve coupling $j$, and this water is distributed over the outer walls of the shell $b^2$ of the generator and is immediately converted into steam, and this steam passes into the steam chamber $a^{10}$ and through the ports or passages $n$ in the bottom of said chamber into the pad $o$, which is thoroughly saturated thereby and the device is used or manipulated for the purpose of saturating the garment to be steamed, cleaned and pressed in the manner of an ordinary sadiron, but in this operation the device is not moved over the surface of the goods in the manner of a sadiron, but is simply pressed thereon and is moved about from point to point by simply raising and lowering it, and from this description it will be apparent that this device is particularly designed for use as a steamer and cleaner, but is also used at the same time as a presser. While we have shown and described the preferred form of our improvement, our invention is not limited to the exact details of the construction thereof herein shown and described, and changes therein and modifications thereof may be made, within the scope of the appended claims, without departing from the spirit of our invention or sacrificing its advantages.

Having fully described our invention, what we claim as new and desire to secure by Letters Patent, is:—

1. A hand-operated device of the class described, comprising a casing composed of separable top and bottom parts and in the bottom of which is a steam chamber, the bottom wall of said chamber being provided with steam ports or passages, a removable steam generator mounted in said casing and having a central combustion chamber inclosed by a steam generating chamber in communication with the steam chamber in the bottom of the casing, a burner device adapted to be inserted into and removed from the combustion chamber, and means for supplying water to the steam generating chamber in the generator.

2. In a device of the class described, a two-part casing, a steam generator mounted in said casing to form an air chamber in one of said parts and a steam chamber in the other, means for supplying water to said generator, means for heating said generator to form steam from the water supplied thereto, means for supplying steam to said steam chamber, and means for discharging the steam from said chamber.

3. In a device of the class described, a two-part casing, a steam generator mounted in said casing to form an air chamber in one of said parts and a steam chamber in the other, said generator being provided with a combustion chamber, a burner device mounted in said combustion chamber, means for supplying water to said generator to form steam, means for discharging the steam generated in said generator into said steam chamber, and means for discharging the steam from said steam chamber.

4. In a device of the class described, a two-part casing, a steam generator mounted in said casing to form an air chamber in one of said parts and a steam chamber in the other, said generator being provided with a combustion chamber, air ports or passages formed in said generator and in communication with said air chamber and said combustion chamber, a burner device mounted in said combustion chamber, means for supplying water to said generator to form steam, means for discharging the steam generated in said generator into said steam chamber, means for discharging the steam from said steam chamber, and means for discharging the products of combustion from said combustion chamber.

5. A hand-operated device of the class described, comprising a casing composed of separable top and bottom parts and in the bottom of which is a steam chamber, the bottom wall of said chamber being perforated to form steam ports or passages and the top part of said casing being provided with a handle, a steam generator mounted in said casing and having a central combustion chamber and in communication with said steam chamber, a burner device adapted to be inserted into the combustion chamber, and means for supplying water to the steam generating chamber.

In testimony that we claim the foregoing as our invention we have signed our names, in presence of the subscribing witnesses, this 28th day of October, 1916.

GEORGE FRANKS.
OSCAR SPROESSIG.

Witnesses:
C. E. MULREANY,
H. E. THOMPSON.